United States Patent [19]

Nichols

[11] 4,005,333
[45] Jan. 25, 1977

[54] APPARATUS FOR INCREASING OUTPUT EFFICIENCY OF AN OPTICALLY PUMPED ND:YAG LASER

[75] Inventor: Richard W. Nichols, Manhattan Beach, Calif.

[73] Assignee: Hughes Aircraft Company, Culver City, Calif.

[22] Filed: June 3, 1974

[21] Appl. No.: 475,685

[52] U.S. Cl. .......................... 315/173; 331/94.5 PE
[51] Int. Cl.² ...................... H05B 37/00; H01S 3/00
[58] Field of Search ........... 315/171, 172, 173, 176

[56] References Cited

UNITED STATES PATENTS

| 3,515,938 | 6/1970 | Morse | 315/173 X |
| 3,551,738 | 12/1970 | Young | 315/171 |

*Primary Examiner*—Robert Segal
*Attorney, Agent, or Firm*—Robert H. Himes; W. H. MacAllister

[57] ABSTRACT

Laser excitation is generally initiated by "dumping" energy from a stored supply into a flashlamp. The flashlamp produces light which is a mixture of both blackbody type radiation and atomic line spectra. That portion of the flashlamp output energy spectrum which overlaps the pump bands of $Nd^{3+}$ causes the inversion population necessary for laser action. It has been determined that the sequence in which energy is initially supplied to the flashlamp is an important parameter. More particularly, light output in the pump bands, and hence laser efficiency, is increased by slightly turning on the flashlamp at a predetermined interval of time prior to the main energy dump. Theory indicates that this method of triggering results in a larger ionic path diameter at the time of main energy release to the flashlamp.

3 Claims, 3 Drawing Figures

APPARATUS FOR INCREASING OUTPUT EFFICIENCY OF AN OPTICALLY PUMPED ND:YAG LASER

The invention herein described was made in the course of or under a contract or subcontract thereunder with the U.S. Army.

BACKGROUND OF THE INVENTION

Two contemporary apparatuses have been employed to initiate flashlamp ignition prior to the main energy dump. The first of these employed what is designated as a "simmer method" wherein an external power supply is used to provide a constant current through the flashlamp thereby keeping it on at all times between pulses. In the apparatus of the present invention, the required voltage for initiating current flow through the flashlamp can be tapped off the transformer supplying voltage to the main energy supply whereby no external power source is required. Further, there is no wasted power as in the simmer method, for the flashlamp is only on for a brief time before the main energy dump. This results in improved total power efficiency.

The second contemporary apparatus employs what is designated the "pseudo-simmer method" wherein a silicon controlled rectifier which controls energy flow to the flashlamp is bypassed by a resistor to provide sufficient current to keep the flashlamp on until the silicon controlled rectifier is triggered at which time the resistor is effectively eliminated as an alternate current path. Disadvantages of this apparatus is that the power loss in the resistor is non-recoverable whereby the overall efficiency thereof is reduced compared to that of an apparatus employing the simmer method.

SUMMARY OF THE INVENTION

In accordance with the present invention, a flashlamp which is placed in a separate external "trigger" cavity is connected across both a main energy supply and a simmer pulse network, the latter of which is isolated from the main energy supply by means of a diode. Current flow from the main energy supply through the flashlamp is controlled by means of a silicon controlled rectifier. The simmer pulse network is characterized by a capacitor for storing energy which, when allowed to flow, flows serially through a saturable inductor, isolating diode and the flashlamp.

Operation is commenced by creating a high voltage field on the trigger cavity which causes the flashlamp to ionize. This allows current to start flowing from a charged capacitor through a saturable inductor of the simmer pulse network. The inductor saturates, causing a current spike, after which the current decreases to normal pre-saturation level and continues a characteristic inductance-capacitance discharge. At a predetermined time during this discharge following the current spike, a trigger signal is generated and impressed upon the silicon controlled rectifier causing it to fire and release the main energy supply through the flashlamp. The isolating diode in the simmer pulse network output prevents current from the main energy supply from flowing through the simmer pulse network.

DESCRIPTION

Figure 1:
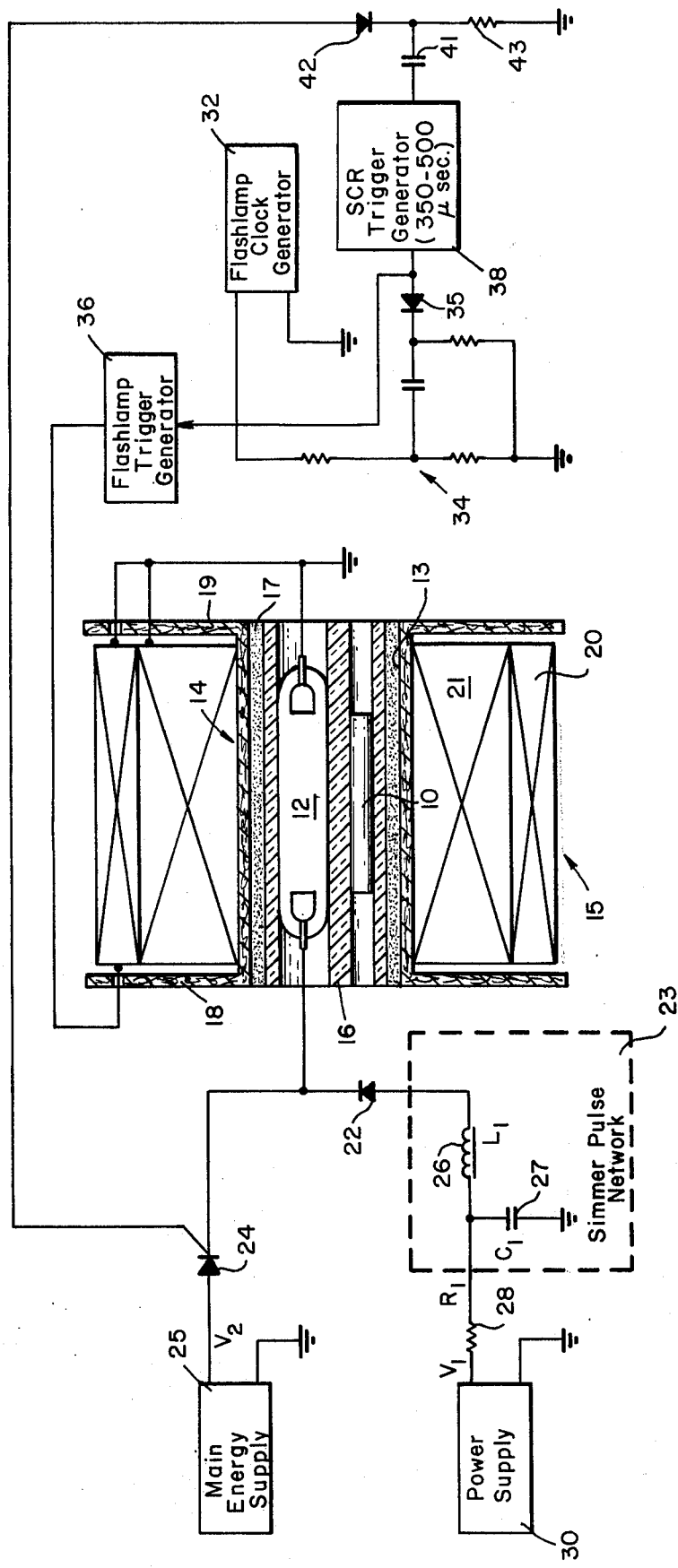
FIG. 1 illustrates a schematic flow-chart diagram of the optical pumping apparatus of the invention with cross-sectional view of the trigger cavity and transformer.

Referring to FIG. 1, there is depicted the laser flashlamp triggering apparatus of the present invention. An elongated element 10 of laser material such as Nd:YAG and a pumping flashtube 12 are mounted in a typical manner by means not shown parallel to one another within a laser cavity 13 provided by a spool-like electrically insulating core 14 for a transformer 15. Transformer core 14 is typically a fiberglass outer container in which is disposed a samarium glass insert 16 adapted to accommodate elongated element 10 and pumping flashtube 12 in separate adjacent parallel holes therein. A reflective non-conductive material 17 is then placed between the samarium glass insert 16 and the fiberglass outer container 14. The fiberglass outer container 14 is provided with a pair of radially outwardly extending annular wall portions 18, 19 at opposite ends thereof, for accommodating the primary and secondary windings 20, 21, respectively, of transformer 15. One end of the outermost secondary winding 21 and the adjacent end of the primary winding 20 are electrically connected together and to ground. The transformer 15 is designed, for example, to produce a 30,000 volt potential at the remaining unconnected end of secondary winding 21 disposed at the inner-most turns thereof in response to a 500 volt pulse applied to the remaining extremity of primary winding 20.

The flashlamp 12 is selected in accordance with the particular laser excitation desired and usually contains krypton or xenon gas at various pressures. These flashlamps are available commercially, such as model L1694 from ILC, Sunnyvale, California. One electrode of the flashlamp 12 is connected to a level of reference potential illustrated as ground while the other electrode of the flashlamp 12 is connected through an isolating diode 22 to the output of simmer pulse network 23 and through a silicon controlled rectifier 24 to the output of a main energy supply 25, the negative terminal of which is referenced to ground. The main energy supply 25 includes a single or multiple pulse forming network fed by a high voltage, current limited source which provides an output potential, $V_2$, that is applied to the anode of silicon controlled rectifier 24. The simmer pulse network (SPN) 23 includes a saturable inductor 26 of inductance $L_1$ serially connected from the output to the input thereof and a capacitor 27 of capacitance $C_1$ shunting the input to ground. The input of simmer pulse network 23 is, in turn, connected through a current limiting resistor 28 of resistance $R_1$ to the output of a power supply 30, the negative terminal of which is referenced to ground and which provides a direct-current output potential of $V_1$ volts. Potential $V_2$ is typically more positive than potential $V_1$ whereby diode 22 is poled to allow current flow towards the flashlamp 12 thereby to effect isolation of the simmer pulse network 23 from the main energy supply 25.

Figure 3:
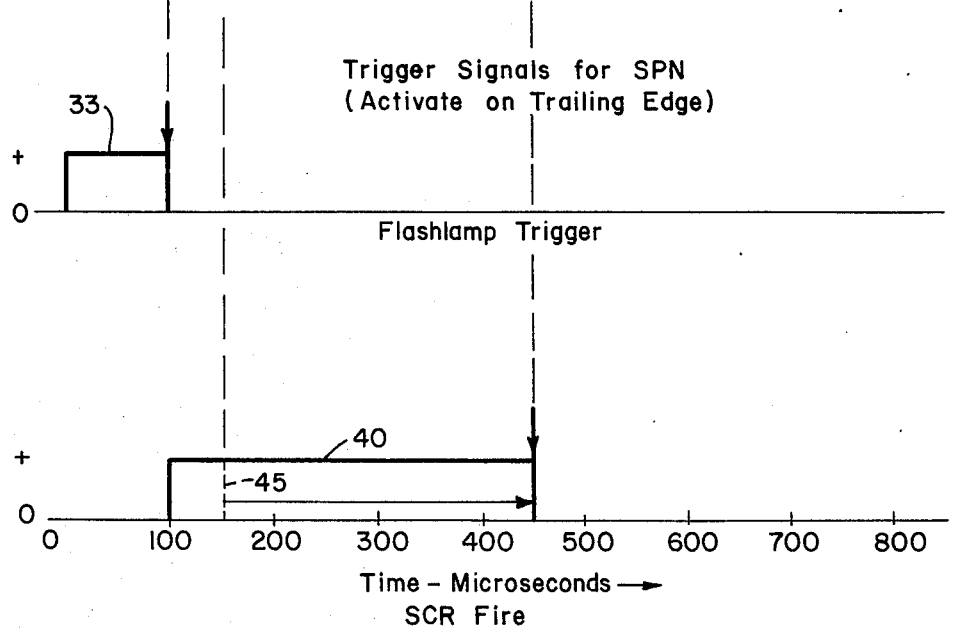
FIG. 3 shows the trigger signals for the simmer pulse network of the present invention.

A flashlamp clock generator 32 develops periodic synchronizing pulses 33, FIG. 3, which are differentiated by a differentiating circuit 34 and connected through a diode 35 to a flashlamp trigger generator 36 and a silicon controlled rectifier (SCR) trigger pulse generator 38. Diode 35 is poled so that only the negative excursions of clock pulses 33 are simultaneously applied to trigger generators 36, 38. The flashlamp trigger generator 36 develops a pulse of the order of 500 volts (not illustrated) which is applied to the primary winding 20 of transformer 15 thereby to develop an electric potential of the order of 30,000 volts on the inner turns of secondary winding 21 which envelops the flashlamp 12 thereby pre-ionizing the gas therein, and causing energy stored in the SPN 23 to flow through the lamp 12 to ground via the conductive ionic path. The SCR trigger pulse generator 38, in response to the same negative excursion, generates a SCR fire waveform 40, FIG. 3, which is a rectangular pulse of from 50 to 500 microseconds in length. The occurrence of the negative excursion of this waveform 40 is used to fire a silicon controlled rectifier 24 during the decrease in current flow through flashlamp 12 from SPN 23. To achieve this function, the output of the SCR trigger pulse generator 38 is serially connected in the order named through a capacitor 41 and diode 42 to the control electrode of silicon controlled rectifier 24, the diode 42 being poled to allow current flow towards the capacitor 41. Further, the intermediate connection between capacitor 41 and diode 42 is connected to ground through a resistor 43. The time constant of the capacitance and resistance of capacitor 41 and resistor 43 is substantially less than the shortest length of pulse 40, i.e., 50 microseconds, thereby to differentiate the pulse 40. The polarity of diode 42 allows only the negative excursion of pulse 40 to be applied to the control electrode of silicon controlled rectifier 24 thereby to allow current to commence flowing from the main energy supply 25 through the flashlamp 12 to ground upon the occurrence thereof.

Figure 2:
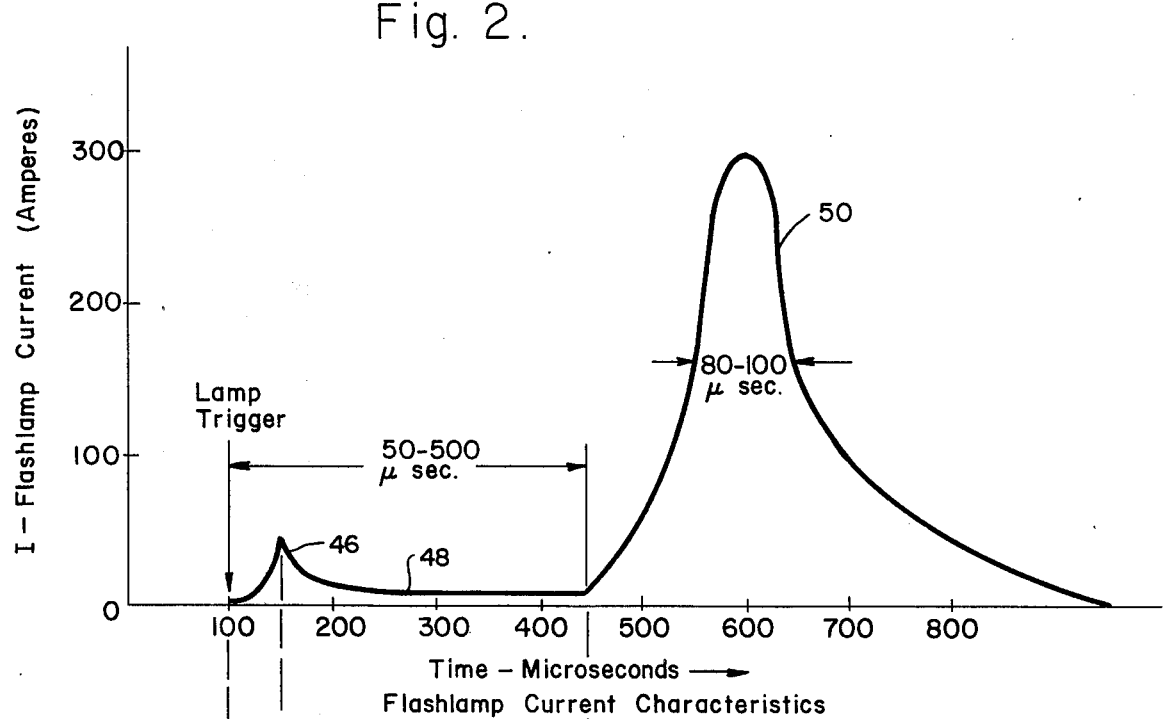
FIG. 2 illustrates the current characteristic of the flashlamp when energized by the apparatus of the invention.

Thus a cycle of operation of the apparatus of the present invention commences with the occurrence of the clock waveform 33, FIG. 3. The length of the waveform 33 is not critical as nothing happens until the negative excursion thereof appears at the anode of diode 35 and is applied simultaneously to the inputs of the flashlamp trigger generator 36 and the SCR trigger pulse generator 38. At this instant, the flashlamp trigger generator 36 develops a pulse on the order of 500 volts which is applied to primary winding 20 of transformer 15 thereby to develop an electric field for 50-100 microseconds in the region occupied by the flashlamp 12 sufficient to ionize the gas therein thereby allowing current to commence flowing therethrough from the simmer pulse network 23. The capacitor 27 of simmer pulse network 23 which is of a capacity sufficient to store from 0.2 to 0.4 joule discharges through inductor 26 which saturates producing a current spike 46 which peaks in from 50 to 100 microseconds through flashlamp 12 as illustrated in the flashlamp current characteristic, FIG. 2. Subsequently the flashlamp current decreases to normal presaturation level and continues a characteristic inductance-capacitance discharge as illustrated by the portion 48 of the flashlamp current characteristic, FIG. 2. At a specific time after the occurrence of current spike 46 and before 500 microseconds in the current flow from the simmer pulse network 23 selected for optimum ionization of the flashlamp 12, i.e. when the ionic path diameter through flashlamp 12 reaches a maximum diameter, the SCR fire waveform 40 undergoes a negative excursion which is differentiated by the capacitor 41, resistor 43 combination, and applied through diode 42 to the control input of SCR 24 thereby releasing current from main energy supply 25 through flashlamp 12 as indicated by the portion 50 of the flashlamp current characteristic, FIG. 2. Since the current spike 46, FIG. 3 occurs 50-100 microseconds after commencement of current flow from the simmer pulse network 23, waveform 40 is of sufficient duration to extend past the current spike 46, i.e. 50-100 microseconds and ends prior to 500 microseconds. Thus, waveform 40 may be as short as 50 microseconds as indicated by dashed line 45, FIG. 3, and as long as 500 microseconds thereby causing the discharge of current from the main energy supply 25 to commence during the decrease in current flow through the flashlamp 12 from the simmer pulse network 23. As previously specified, the main energy supply 25 includes a pulse forming network fed by a current limited source which allows the current through flashlamp 12 to peak at a value determined by the parameters of the pulse forming network and then fall off to zero over a "half-power" time interval which again is determined by the parameters of the pulse forming network of the main energy supply 25. Typically, the peak current is of the order of 300 amperes and the "half-power" time interval is from 80 to 100 microseconds. The diode 22 prevents current from the main energy supply 25 from flowing into the simmer pulse network 23.

What is claimed is:

1. An apparatus for optically pumping a laser, said apparatus comprising a longitudinal flashlamp having first and second electrodes adapted to be mounted parallel to and coextensive with an element of laser material, said first electrode being maintained at a substantially fixed reference potential level; a main energy storage device for storing an electric charge at a first potential relative to said reference potential level; an auxiliary power supply for providing direct-current energy at a second potential level relative to said reference potential level, said second potential level being no greater than the first potential level; a current limiting resistor, and inductor and a diode serially connected in the order named from said auxiliary power supply to said second electrode of said flashlamp, said diode being poled to allow current flow towards said flashlamp; a storage capacitor having a first electrode connected to the junction between said current limiting resistor and said inductor and a second electrode maintained at a reference potential level whereby said first electrode of said storage capacitor charges to said second potential level; means for preionizing said flashlamp thereby to allow said storage capacitor to discharge serially through said inductor and said flashlamp; and means coupled from said main energy storage device to said second electrode of said flashlamp for electronically releasing energy therefrom through said flashlamp at a predetermined interval of time subsequent to said flashlamp being pre-ionized during the discharge of said storage capacitor.

2. The apparatus for optically pumping a laser as defined in claim 1 wherein said inductor is saturable.

3. The apparatus for optically pumping a laser as defined in claim 1 wherein said predetermined interval of time subsequent to said flashlamp being pre-ionized is from 300 to 500 microseconds.

* * * * *

UNITED STATES PATENT OFFICE
CERTIFICATE OF CORRECTION

Patent No. 4,005,333            Dated January 25, 1977

Inventor(s) Richard W. Nichols

It is certified that error appears in the above-identified patent and that said Letters Patent are hereby corrected as shown below:

Column 4, line 43, "and" first occurrence should read -- an --.

Signed and Sealed this

Thirty-first Day of May 1977

[SEAL]

*Attest:*

RUTH C. MASON
*Attesting Officer*

C. MARSHALL DANN
*Commissioner of Patents and Trademarks*